United States Patent
Lengsfeld et al.

(10) Patent No.: US 9,180,628 B2
(45) Date of Patent: Nov. 10, 2015

(54) METHOD AND DEVICE FOR THE PRODUCTION OF TUBULAR STRUCTURAL COMPONENTS

(71) Applicant: AIRBUS OPERATIONS GMBH, Hamburg (DE)

(72) Inventors: Hauke Lengsfeld, Helmste (DE); Volker Reye, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/285,704

(22) Filed: May 23, 2014

(65) Prior Publication Data
US 2014/0346715 A1 Nov. 27, 2014

Related U.S. Application Data (63) Continuation of application No. 12/794,487, filed on Jun. 4, 2010, now abandoned, which is a continuation of application No. PCT/EP2008/065355, filed on Nov. 12, 2008.

(60) Provisional application No. 61/007,492, filed on Dec. 13, 2007.

(30) Foreign Application Priority Data

Dec. 13, 2007 (DE) .......................... 10 2007 060 029

(51) Int. Cl.
*B29C 70/34* (2006.01)
*B29C 70/44* (2006.01)
(Continued)

(52) U.S. Cl.
CPC ............. *B29C 70/345* (2013.01); *B29C 33/505* (2013.01); *B29C 70/36* (2013.01);
(Continued)

(58) Field of Classification Search
CPC .. B29C 70/345; B29C 33/505; B29C 70/443; B29C 70/446; B29C 70/36; B29C 70/541
See application file for complete search history.

(56) References Cited

U.S. PATENT DOCUMENTS 2,739,350 A 1/1952 Lampman
2,815,534 A 7/1954 Ising et al.
(Continued)

FOREIGN PATENT DOCUMENTS

DE 69109642 9/1995
DE 19803909 A1 8/1999
(Continued)

OTHER PUBLICATIONS

German Office Action for DE 10 2007 060 029.3-16 dated Jun. 23, 2008.
(Continued)

*Primary Examiner* — Jeff Aftergut
(74) *Attorney, Agent, or Firm* — Jenkins, Wilson, Taylor & Hunt, P.A.

(57) ABSTRACT

A method for producing a tubular structural component and device for production thereof are disclosed. A tubular molding tool has an inner mold surface shaped corresponding to an outer surface of the structural component. A support surface of an expandable support, formed corresponding to the molding tool shape such that in an unexpanded state the support fills the molding tool while the support surface and the mold surface run parallel leaving an expansion spacing of the support surface to the mold surface, is covered with a tubular non-crimp fiber fabric, such that fibers of a fiber layer of the non-crimp fiber fabric run diagonally around the support. After the support has been arranged in the molding tool, the non-crimp fiber fabric is pressed against the mold surface by expanding the support with radial expansion of the non-crimp fiber fabric. The non-crimp fiber fabric is infiltrated by a curable matrix.

12 Claims, 6 Drawing Sheets (51) Int. Cl.
    *B29C 33/50*     (2006.01)
    *B29D 23/00*     (2006.01)
    *B30B 5/02*     (2006.01)
    *B29C 70/36*     (2006.01)
    *B29C 70/54*     (2006.01)
    *B29L 23/00*     (2006.01)
    *B29L 31/30*     (2006.01)
    *B29K 307/04*     (2006.01)

(52) U.S. Cl.
    CPC ............ *B29C 70/443* (2013.01); *B29C 70/446* (2013.01); *B29C 70/541* (2013.01); *B29D 23/001* (2013.01); *B30B 5/02* (2013.01); *B29K 2307/04* (2013.01); *B29L 2023/22* (2013.01); *B29L 2031/3082* (2013.01); *Y02T 50/433* (2013.01)

(56) References Cited

U.S. PATENT DOCUMENTS

| | | | |
|---|---|---|---|
| 2,995,781 | A | 8/1961 | Sipler |
| 3,049,901 | A | 8/1962 | Greczin |
| 5,695,008 | A | 12/1997 | Bertet et al. |
| 7,824,171 | B2 | 11/2010 | Hanson et al. |
| 2008/0289743 | A1* | 11/2008 | Tsotsis ............................ 156/93 |
| 2009/0277568 | A1 | 11/2009 | Weimer |

FOREIGN PATENT DOCUMENTS

| | | |
|---|---|---|
| DE | 19913079 A1 | 9/2000 |
| DE | 10 2004/006615 | 10/2005 |
| EP | 0408161 A2 | 1/1991 |
| EP | 0491650 A2 | 6/1992 |
| EP | 0911143 | 4/1999 |
| EP | 1134069 A1 | 6/2000 |
| EP | 1473132 A2 * | 11/2004 |
| EP | 2128017 | 12/2009 |
| JP | 2007/062150 | 3/2007 |
| JP | 2010/516559 | 5/2010 |
| RU | 2123571 C1 | 12/1998 |
| RU | 2156397 | 9/2000 |
| WO | WO-0061464 | 10/2000 |
| WO | WO-2004/011169 | 2/2004 |

OTHER PUBLICATIONS

International Search Report and Written Opinion for PCT/EP2008/065355 dated Jan. 29, 2009.
German Office Action for German Application No. 10 2007 060 029.3 dated Jun. 21, 2011.
Russian Office Action for Application No. 2010/12262 dated Sep. 24, 2012.
Chinese Office Action for Application No. 200880120453.0 dated Nov. 12, 2012.
Non-Final Office Action for U.S. Appl. No. 12/794,487 dated Dec. 10, 2012.
Russian Decision to Grant for Application No. 2010122662/05 dated Feb. 22, 2013.
Japanese Office Action for Application No. 2010-537352 dated Mar. 5, 2013.
European Office Action for Application No. 08860048.1 dated Oct. 21, 2014.
Non-Final Office Action for U.S. Appl. No. 12/794,487 dated May 16, 2013.

* cited by examiner

METHOD AND DEVICE FOR THE PRODUCTION OF TUBULAR STRUCTURAL COMPONENTS

CROSS-REFERENCE TO RELATED APPLICATIONS

This application is a continuation of U.S. patent application Ser. No. 12/794,487 filed Jun. 10, 2010, which is a continuation of PCT/EP2008/065355 which claims the benefit of U.S. Provisional Application No. 61/007,492, filed Dec. 13, 2007 and German Patent Application No. 10 2007 060 029.3, filed Dec. 13, 2007, the entire disclosures of which are herein incorporated by reference.

FIELD OF THE INVENTION

The present invention relates to a method and a device for the production of a tubular structural component, in particular a fuselage barrel section of an aircraft or spacecraft.

Although the present invention and the problem on which it is based can be applied to any tubular structural components with any cross-sectional shapes, they will be described in detail in respect of the production of fuselage barrel sections of aircraft.

In the construction of aircraft fuselage, particularly for commercial aircraft, it is usual to prefabricate tubular or barrel-shaped fuselage sections individually and to assemble them into the finished fuselage in a subsequent final assembly. Materials which are used to an increasing extent are fibre composite materials, for example carbon fibre reinforced plastics materials (CFRP) which make it possible to achieve a high stability of the sections with a relatively low weight.

A fuselage barrel section based on fibre composite materials is produced according to a conventional method using a winding body as a positive mould, onto which layers of a fibre material pre-impregnated with a resin matrix (prepreg) are wound and subsequently cured, for example by a heat treatment. The fibre placement or winding procedure is very time-intensive due to the size of the component and to different fibre directions of the prepreg layers.

Since it is possible for slight differences in diameter of adjacent fuselage barrel sections to impede the final assembly, the winding body has to have a high dimensional accuracy and must not expand any further after the fibre placement procedure, for example during a heat treatment. At the same time, it is necessary to configure the winding body such that it can be split or collapsed, so that after the curing procedure, it can be contracted inwards by splitting or collapsing and can be removed from the fuselage barrel section. The provision of a winding body which combines these characteristics is associated with high costs.

In order to obtain a fuselage barrel section which has a smooth outer surface and correspondingly advantageous aerodynamic characteristics, pressure sheets are also applied for the curing procedure. In this case, there must not be any auxiliary material, for example tear-off or ventilation fabric between the pressure sheet and prepreg layers as this would result in a rough surface of the fuselage barrel section. In general, it is not possible to remove excess resin or air from the space between the winding body and the pressure sheets. However, an inadequate removal of resin or air results in porous and thus low-quality components.

Further problems are caused in that the thickness of the prepreg layers is reduced during the curing procedure by the so-called setting path, which is to be considered during shaping and when the pressure sheets are pressed on. However, the setting path of the prepreg material can vary as a function of the material charge and thus, for example when there is a charge with a relatively long setting path, this can give rise to porosity. Since the internal diameter of the fuselage barrel section is predetermined in a fixed manner by the external diameter of the winding body, the external diameter of the fuselage barrel section is reduced during the gradual setting of the prepreg interlaid scrim. Consequently, the prepreg layers are pushed together in the peripheral direction of the section, which readily results in an undesirable waviness of the fibres.

SUMMARY

It is therefore the object of the present invention to achieve a high quality at a low cost when tubular structural components and in particular fuselage barrel sections are produced.

The idea on which the present invention is based is to use for the production of the structural component a moulding tool which is also tubular and is configured as a negative mould, i.e. it has an inner mould surface which is a negative of the outer surface to be formed of the structural component. The term "tubular" as used herein is not restricted to tubes with a circular cross section, but explicitly includes tubes with elliptical, rectangular or other randomly shaped cross sections, in which case the cross section does not need to be constant over the length of the tubes, but can be narrowed, widened or shaped in another way.

In order to arrange non-crimp fibre fabrics on the inner surface of the moulding tool, a support is also provided which can be expanded, in other words can be selectively brought at least into an expanded and an unexpanded state. In the unexpanded state, the shape of the support is smaller than the space described by the inner surface of the moulding tool such that the support can be arranged in this state inside the moulding tool. In so doing, there remains between the inner surface of the moulding tool and an outer surface of the support a minimum spacing which is termed here the expansion spacing.

The outer surface of the support which opposes the inner surface of the moulding tool when the support is arranged in the moulding tool serves as a support surface which supports the non-crimp fibre fabric to be processed during the production process. The non-crimp fibre fabric is provided in tubular form and arranged on the support surface such that the support surface is covered by the tubular non-crimp fibre fabric. For example, the tubular non-crimp fibre fabric is pulled over the support while the support, in the unexpanded state, is freely accessible outside the moulding tool.

The support is then arranged in the moulding tool such that the support surface covered by the tubular non-crimp fibre fabric is opposite the inner surface of the moulding tool, the expansion spacing which is reduced by the thickness of the non-crimp fibre fabric remaining between the non-crimp fibre fabric and the inner surface. The support is then expanded, as a result of which this remaining spacing is shrunk to zero and the non-crimp fibre fabric is pressed against the inner surface of the moulding tool by the support surface of the expanded support. In a final step, the non-crimp fibre fabric held between the support surface and the inner surface of the moulding tool is infiltrated by a curable matrix.

The use of a negative mould which reproduces the outer contour of the fuselage barrel section makes it possible to observe the desired external dimensions with a high degree of accuracy. The moulding tool can be configured without a considerable constructive expense in one piece or in a simple manner such that it can be opened outwards or can be disassembled. The setup of the non-crimp fibre fabric on the support, regardless of the moulding tool and curing tool, makes it possible to provide a plurality of supports suitable for a given moulding tool and to alternately charge one of the supports with non-crimp fibre fabric outside the moulding tool, while another support is located in the moulding tool for curing. In this manner, it is possible to use the moulding tool and, if appropriate, a curing station in a continuous manner, which reduces the production costs and shortens dead time.

The use of non-crimp fibre fabric which is infiltrated by a separately provided matrix affords further advantages in terms of time and greater freedom in the construction of the structural components which have been produced compared to the conventional use of prepregs. Fibre undulations are prevented due to the fact that the non-crimp fibre fabric is stretched by the expansion of the support in the peripheral direction.

According to a preferred development, the expansion spacing is between 1 and 10 cm, for example approximately 5 cm. With such a spacing, sufficient clearance remains between the support surface and the inner surface of the moulding tool in order to move the support into and out of the moulding tool in a particularly fast and contact-free manner, while on the other hand the tubular non-crimp fibre fabric is prevented from being overstretched during the expanding procedure.

According to a preferred development, the support surface is covered such that fibres of a fibre layer of the non-crimp fibre fabric run diagonally around the support. This advantageously allows the tubular non-crimp fibre fabric to expand radially, the angle of inclination of the fibres changing without the fibres being overstretched in their longitudinal direction. After the support has been covered, the tubular non-crimp fibre fabric is preferably longer than the structural component, such that when the support is expanded radially, the non-crimp fibre fabric is able to contract in its longitudinal direction, while still completely covering the support surface.

According to a preferred development, the support comprises a pressure membrane, the support being expanded by the production of a pressure differential between an inner region of the support and an intermediate region between the pressure membrane and the moulding tool. The pressure membrane exerts on the tubular non-crimp fibre fabric a uniform contact pressure which can be precisely adjusted by the pressure differential, over the entire inner surface of the tubular moulding tool, which allows a particularly uniform shaping of the wall of the structural component.

To produce the pressure differential, the pressure in the inner region of the support is preferably increased above atmospheric pressure. Suitable compression devices can be accommodated inside the support, so that when the support is arranged in the moulding tool, the support can be expanded without sealing off the intermediate region, for example. Alternatively or in addition, to produce the pressure differential, the pressure in the intermediate region between the pressure membrane and the moulding tool is decreased below atmospheric pressure. This allows the inner region to be made accessible, for example for inspection purposes. The pressure membrane does not need to be configured for high absolute pressures.

According to a preferred development, a step is furthermore provided for arranging a reinforcing element between the support surface and the non-crimp fibre fabric. This makes it possible to connect the reinforcing element, for example a stringer, to be connected to the structural component in a single operation with the production of the structural component. The reinforcing element is preferably guided in at least one guide slot which runs in a radial direction of the tubular moulding tool, while the support is being expanded. The reinforcing element is thus guided precisely into the desired connecting position without tilting.

According to a preferred development, the reinforcing element is arranged between the support surface and the non-crimp fibre fabric as a pre-impregnated or non-impregnated semi-finished fibre product. The reinforcing element is connected by jointly infiltrating the reinforcing element and the wall of the tubular structural component and by a joint curing process.

According to another preferred development, the reinforcing element is arranged between the support surface and the non-crimp fibre fabric as a pre-cured semi-finished fibre product. This allows the co-bonding of the reinforcing element with the wall of the tubular structural component, in which case for example the curable matrix with which the tubular non-crimp fibre fabric is infiltrated, acts as an adhesive.

According to a preferred development, the reinforcing element is arranged in a correspondingly configured recess in the support surface. This facilitates the charging of the support with the reinforcing element.

According to a preferred development, a placeholder is arranged in a cavity between the reinforcing element and the tubular non-crimp fibre fabric. During the curing procedure when the reinforcing element is subjected to the mutual pressure of the support surface and the inner surface of the moulding tool, this placeholder keeps the desired cavity of the reinforcing element free. The placeholder preferably has a membrane sheath, in which case a step is furthermore provided for expanding the placeholder by increasing a pressure in the membrane sheath. A placeholder which can be expanded in this manner can be contracted again after the curing procedure and can therefore be easily removed.

According to a preferred development of the device according to the invention, at least one guide cover is provided for positioning on at least one end of the moulding tool ad/or of the support. The guide cover has a guide slot which runs in a radial direction of the tubular moulding tool and is to guide the reinforcing element. During the expansion of the support, the guiding slot guides the reinforcing element precisely in a radial direction into the desired position on the inside of the structural component, irrespective of the shape of the reinforcing element and the shape of the support surface.

BRIEF DESCRIPTION OF THE DRAWINGS

In the following, the invention is described in detail on the basis of embodiments with reference to the accompanying figures of the drawings.

DETAILED DESCRIPTION

In the figures, the same reference numerals denote the same or functionally identical components, unless indicated otherwise.

Figure 1A:
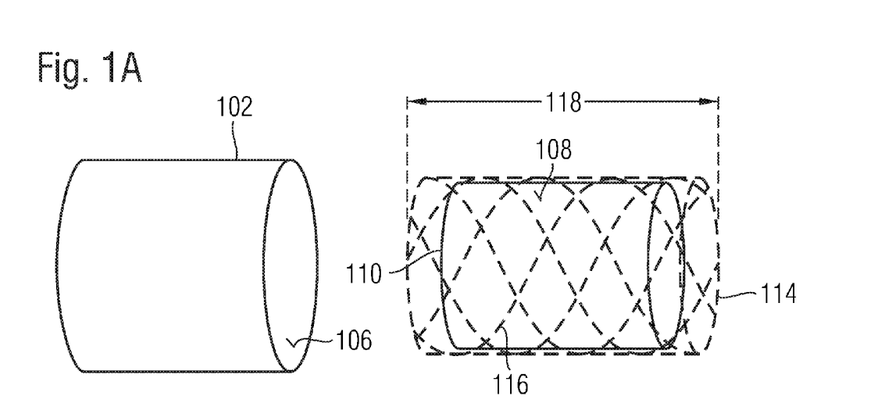
FIG. 1A-C are schematic perspective views of a device for the production of a fuselage barrel section of an aircraft according to a first embodiment of the invention.
Figure 1B:
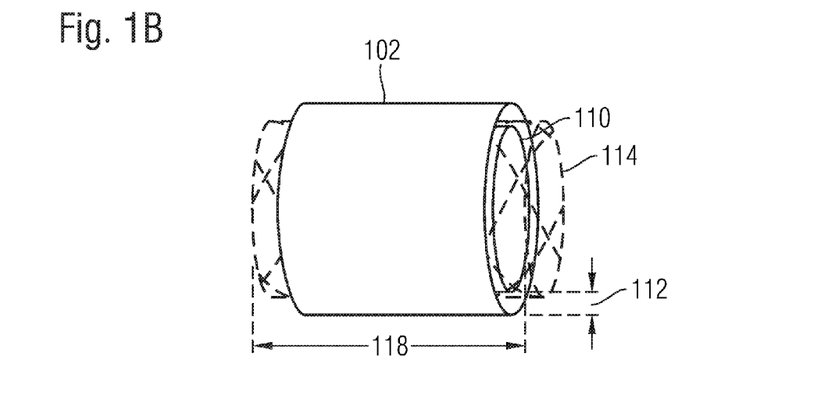
Figure 1C:
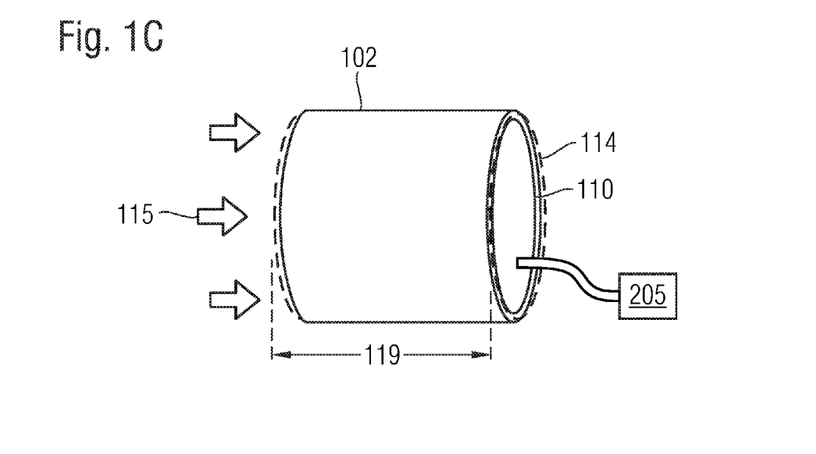

FIG. 1A to 1C are three schematic perspective views of a device for the production of a fuselage barrel section of an aircraft, each of the three figures showing different steps of a production method. The fuselage barrel section to be produced is approximately in the shape of a cylinder barrel, the cross section typically differing from the ideal circular shape and changing over the length of the section.

FIG. 1A shows a tubular moulding tool 102 with an inner surface 106 which is shaped corresponding to the desired shape of the outer surface of the fuselage barrel section to be produced. The moulding tool 102 is a so-called negative mould, because its inner surface 106 forms a negative shape for the outer surface of the fuselage barrel section. Next to the moulding tool 102 is a support 110 for supporting a tubular non-crimp fibre fabric 114.

The support 110 is of an approximately cylindrical shape, having approximately the same length as the moulding tool 102 and an external diameter which is slightly smaller than the internal diameter of the moulding tool. Consequently, it can be arranged both inside and outside the moulding tool 102. The support 110 comprises an inner frame which defines the illustrated shape and its lateral surface 108 is covered by a resilient pressure membrane which separates an inner region of the support from the outside in a pressure-tight manner. For the simple, contact-free insertion of the support inside the moulding tool, the support and/or the moulding tool can be provided with rollers for example (not shown).

The surface of the pressure membrane arranged around the lateral surface 108 of the approximately cylindrical support 110 forms a support surface 108 which supports the tubular non-crimp fibre fabric 114 during the production of the fuselage barrel section. At the start of the production method, the support 110 is arranged outside the moulding tool 102. The tubular non-crimp fibre fabric 114 is cut to size and drawn over the support 110 until it completely covers the support surface 108. The non-crimp fibre fabric 114 used is for example a non-woven fabric such as for example a so-called NCF (non-crimped fabric) consisting of carbon fibres or other suitable fibres, which may be reinforced locally according to constructive details of the fuselage section to be produced. The non-crimp fibre fabric 114 comprises a plurality of fibre layers of different orientations in which the fibres 116 run diagonally, as shown by way of example, i.e. spirally around the periphery of the support 110. In further fibre layers (not shown), fibres run at other inclination angles diagonally or parallel to the longitudinal direction of the support 110.

The length 118 of the cut tubular non-crimp fibre fabric 114 is greater than the length of the support 110 and of the moulding tool 102, such that the non-crimp fibre fabric 114 not only covers the support surface 108 of the support 110, but projects beyond the support 110 at both ends thereof.

FIG. 1B shows a subsequent step of the production method in which the support 110 covered by the non-crimp fibre fabric 114 has been moved into the moulding tool 102. Since the diameter of the support 110 is smaller than the internal diameter of the moulding tool 102, the support 110 fits into the moulding tool 102 without the support surface 108 contacting the inner surface 106 of the moulding tool. Instead, the support surface 108 and the inner surface 106 of the moulding tool 102 run approximately parallel, a minimum spacing 112 of, for example 5-10 cm remaining at any point between them. The non-crimp fibre fabric 114 covering the support surface 108 projects at both ends out of the moulding tool 102 due to its length 118.

FIG. 1C shows a further step of the production method in which a compressor 205 has produced an excess pressure in the inner region of the support 110. The pressure membrane, forming the support surface, of the support is inflated by the excess pressure, such that the support 110 is expanded radially beyond the dimensions of its inner frame. The radial expansion of the support 110 stretches the tubular non-crimp fibre fabric 114 in the direction of the periphery of the support 110. At the same time, due to the fibres 116 which run diagonally around the support, the tubular non-crimp fibre fabric 114 has contracted in its longitudinal direction up to a shortened length 119. In this respect, the tubular non-crimp fibre fabric 114 had initially been cut generously such that it still completely covered the support surface even with its shortened length.

In the illustrated expanded state of the support 110, the pressure membrane presses the non-crimp fibre fabric 114 against the inner surface 108 of the moulding tool due to the excess pressure in the inner region of the support 110. In a further step, the non-crimp fibre fabric, fixed in this manner, is infiltrated by a liquid, curable resin matrix 115, for example in that the resin matrix is introduced from one end of the moulding tool 102, as indicated by arrows, into the gap between the pressure membrane and the moulding tool 102.

The resin matrix is then cured, for example by a heat treatment. The excess pressure is discharged from the inner region of the support 110, so that the support 110 returns into its original, unexpanded state and can easily be removed from the moulding tool 102. The finished fuselage barrel section is removed from the moulding tool 102. Sections which are moulded such that they taper towards one end are removed from the moulding tool 102, for example in the direction of the other end. Alternatively, the moulding tool 102 can be configured in two or more parts, such that it can be opened for the finished section to be removed.

A further embodiment of the production method will now be described in more detail with reference to FIG. 2A-G. FIG. 2A-G are each cross-sectional views of a detail of the periphery of the support 110 for different steps of the method.

Figure 2A:
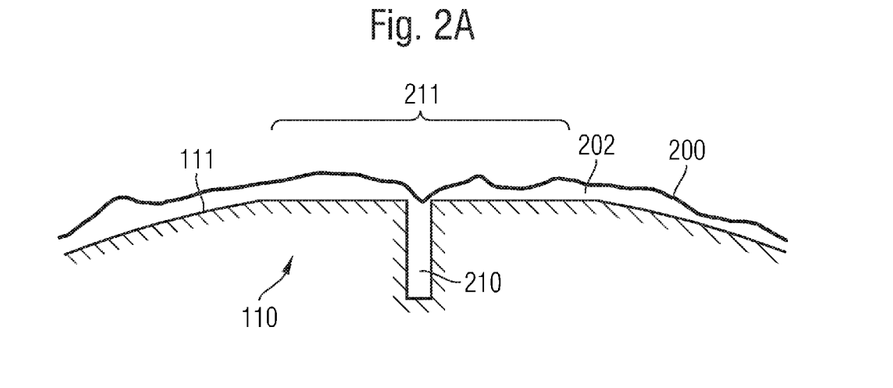
FIG. 2A-G are cross-sectional views of details of a device according to a second embodiment during the production of a tubular structural component.

FIG. 2A shows the mentioned detail of the support 110 in a starting state in which a non-crimp fibre fabric has not yet been arranged on the support surface 108 and the support 110 is outside the moulding tool 102. The support 110 comprises a rigid support frame 111 with a substantially circular cross section. The support frame 111 is formed from aluminium, for example and has on its surface a large number of small holes for charging with vacuum and/or excess pressure, which have not been shown here to improve clarity. A slot-like recess 210 is configured in one location of its periphery to later receive a reinforcing element. The periphery of the support frame 111 is flattened in an edge region 211 on both sides of the recess 210.

The surface of the support frame 111 is covered by a pressure membrane 200 which extends over the entire lateral surface of the overall approximately cylindrical support frame 111 and is connected to the surface of the support frame 111 in a pressure-tight manner at the edges of the lateral surface. An inner region 202 between the pressure membrane 200 and the support frame 111 is therefore sealed off in a pressure-tight manner from the exterior. The pressure membrane 200 is configured as a plastics material film, for example.

Figure 2B:
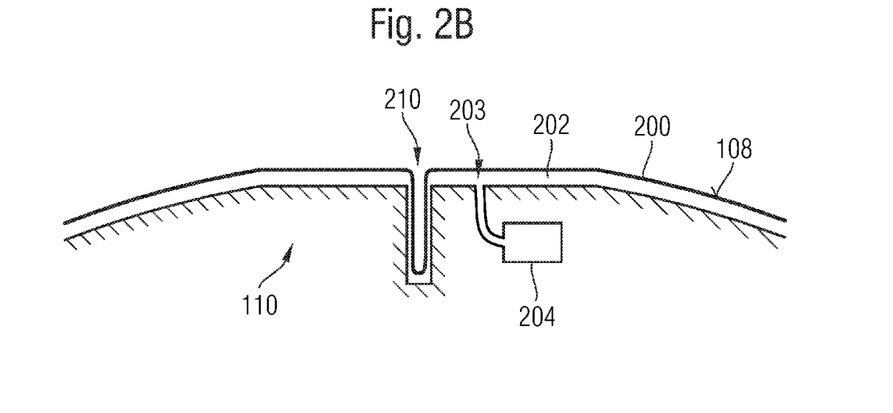

FIG. 2B shows a state of the support 110 of FIG. 2A after a vacuum pump 204 has been connected to the interior 202 and has evacuated it via the fine holes 213 in the surface of the support frame 111, of which only one hole 213 is shown here by way of example. The vacuum in the interior 202 tightly suctioned the pressure membrane against the support frame 111. In particular, the pressure membrane follows the contour of the support frame 111 as far as into the recess 120.

Figure 2C:
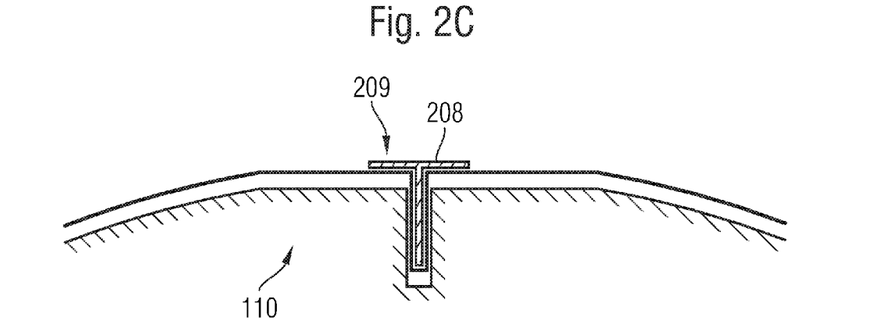

In FIG. 2C, a reinforcing element 208 with a T-shaped profile, as used for example in aircraft construction as a so-called T-stringer, has been inserted into the recess 120. The horizontal bar 209 of the T-shaped profile rests inside the flattened area 211 against the support frame 111 covered by the pressure membrane 200.

Figure 2D:
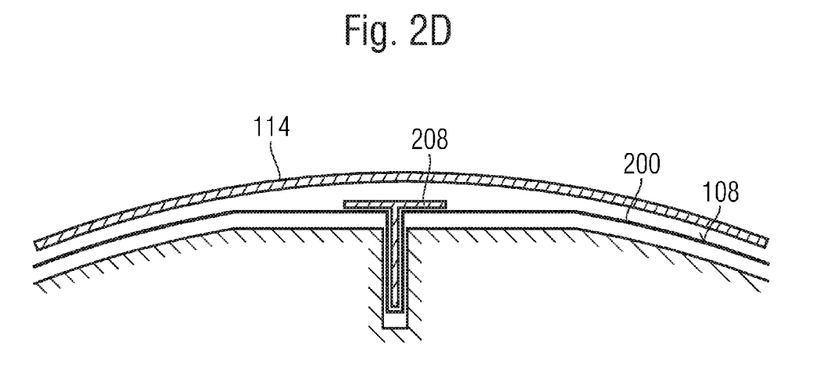

In FIG. 2D, the pressure membrane 200 has been covered by a tubular non-crimp fibre fabric 114 consisting of carbon fibres. The outer surface 108 of the pressure membrane 200 acts as the support surface 108, supporting the non-crimp fibre fabric 114, of the support 110. The reinforcing element 208 is included between the support surface 108 and the non-crimp fibre fabric 114 and is held in the recess 210. Since the horizontal bar 209 of the T-shaped profile is also in a concealed position inside the flattened area 111, the non-crimp fibre fabric 114 does not have a bulge above the reinforcing element 208, but follows a gentle curve.

Figure 2E:
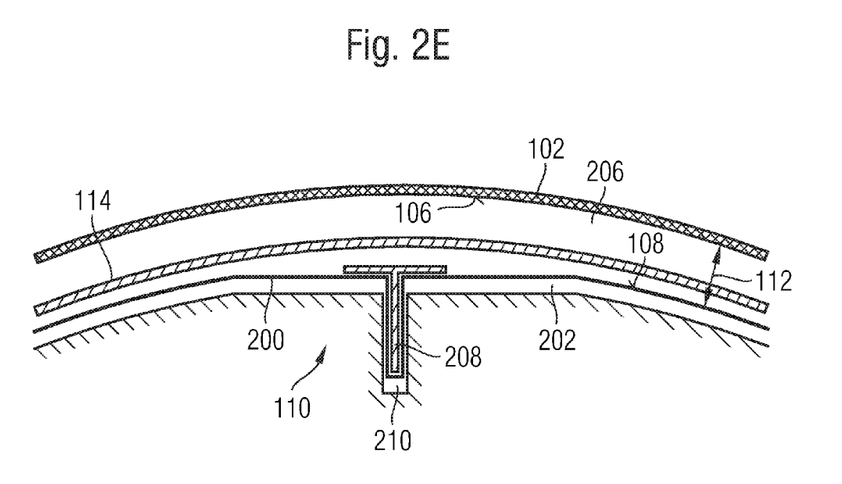

FIG. 2E shows the support 110 which has been prepared in this manner and has been charged with the reinforcing element 208 and the non-crimp fibre fabric 114, after it has been pushed into a tubular moulding tool 102. The support 110 is smaller than the interior of the moulding tool 102 and is configured corresponding to the shape of said moulding tool to the extent that a spacing 112 always remains between its support surface 108 and the surface 106 of the moulding tool. In other words, the support surface 108 and the mould surface 106 run parallel to one another in the spacing 112 in the illustrated state. On the other hand, the non-crimp fibre fabric 114 and the pressure membrane 200 as well as the pressure membrane and the support frame 111 contact one another and are shown at a distance from one another in FIG. 2B-E merely for the sake of clarity.

Figure 2F:
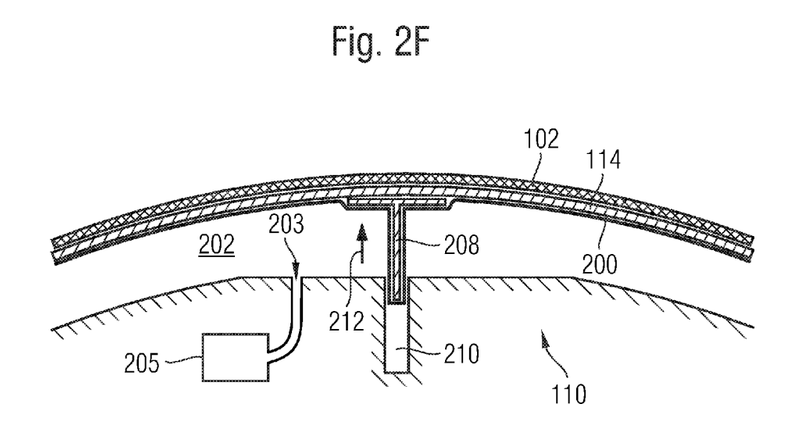

FIG. 2F shows the support 110 arranged in the moulding tool 102 after the interior 202 between the support frame 111 and the pressure membrane 200 has been connected to a compressor 205 and has been subjected to excess pressure through the fine holes 203. The excess pressure has inflated the pressure membrane 200 such that it has expanded in a radial direction 212 as far as the surface 106 of the moulding tool 102. Both the pressure membrane and the non-crimp fibre fabric have been stretched by the expansion. The reinforcing element 208 and the non-crimp fibre fabric 114 have been guided by the expanding pressure membrane 200 to the mould surface 106 and, in the illustrated state, are pressed against the mould surface 106 with uniform contact pressure provided by the excess pressure. During the expansion procedure, the reinforcing element 208 has been guided through the recess 120 in a radial direction 112 and, in the illustrated state, is also still held in the recess 120, as in a guide slot, and is thus positioned precisely.

Figure 2G:
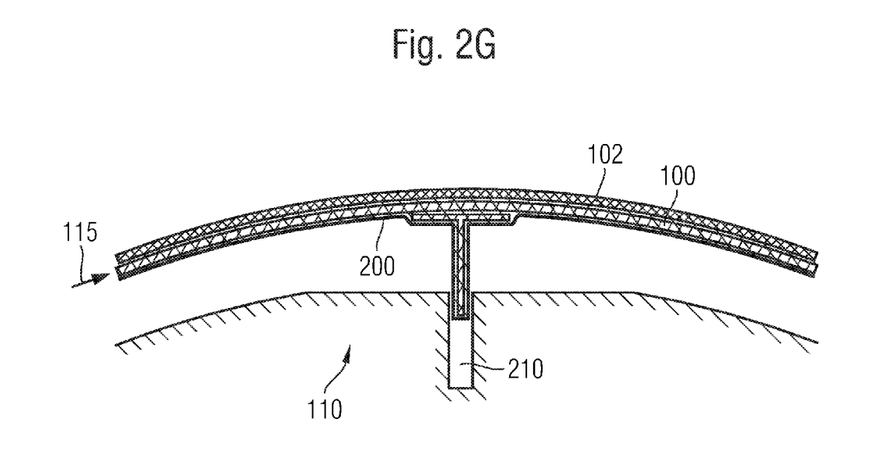

FIG. 2G shows the state after the space between the pressure membrane 200 and the moulding tool 102 has been filled with a curable matrix system 115. The matrix 115 has infiltrated both the non-crimp fibre fabric 114 and the fibre material of the reinforcing element 208, as indicated by the hatching. The excess pressure in the inner region 202 of the support 110 is maintained during the subsequent curing procedure by a heat treatment. The excess pressure is then discharged and the finished fuselage barrel section 100 is removed from the moulding tool 102.

FIG. 3A-D show another embodiment of the production method. The figures are again each cross-sectional views of details of the periphery of the support 110 for different steps of the method.

Figure 3A:
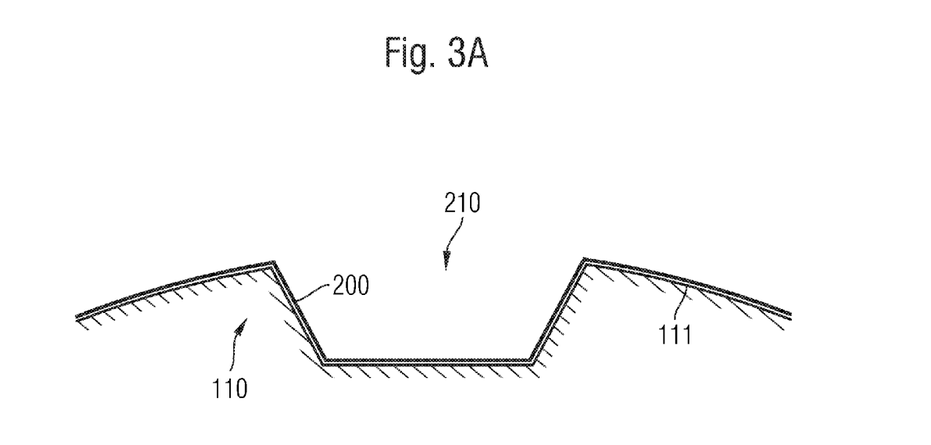
FIG. 3A-D are cross-sectional views of details of a device according to a third embodiment during the production of a tubular structural component.

FIG. 3A shows a state corresponding to FIG. 2B in which a pressure membrane 200 has been arranged tightly along the surface of a support frame 111, for example likewise by evacuating the interlying inner region of the support. As in the above embodiment, a recess 120 for a reinforcing element is configured in the support frame 111, said recess having here, however, the shape of a wide, trapezoidal trough.

Figure 3B:
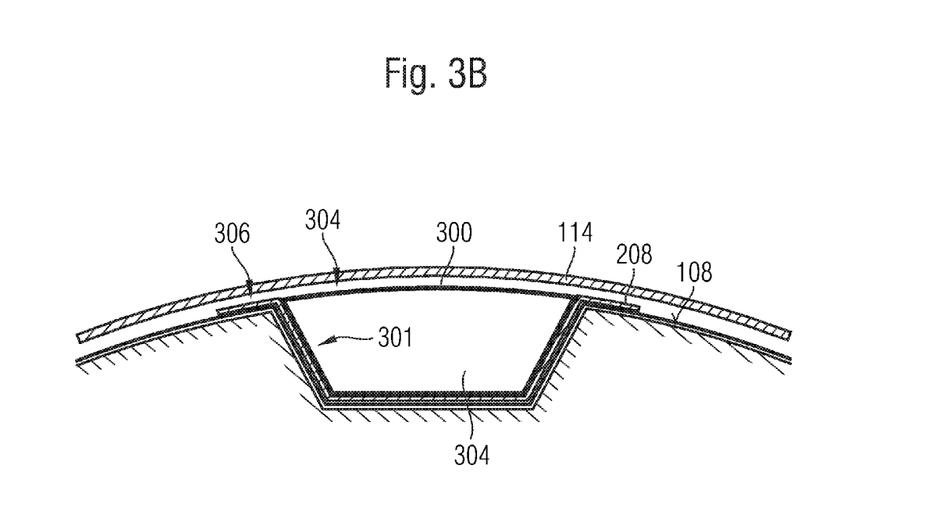

In the state shown in FIG. 3B, a reinforcing element 208 which is formed from prepreg and has an Ω-shaped profile, a so-called Ω stringer has been arranged in the recess 210. A cavity 304 to be configured in the finished fuselage barrel section under the Ω-shaped profile of the stringer 208 is filled here by a placeholder 300 which is formed in this case by way of example from a membrane sheath 301 filled with compressed air. A tubular non-crimp fibre fabric 114 covers the support surface 108 formed by the pressure membrane 200, the foot portion 306 of the C) stringer and the outwardly facing side of the placeholder 300.

Figure 3C:
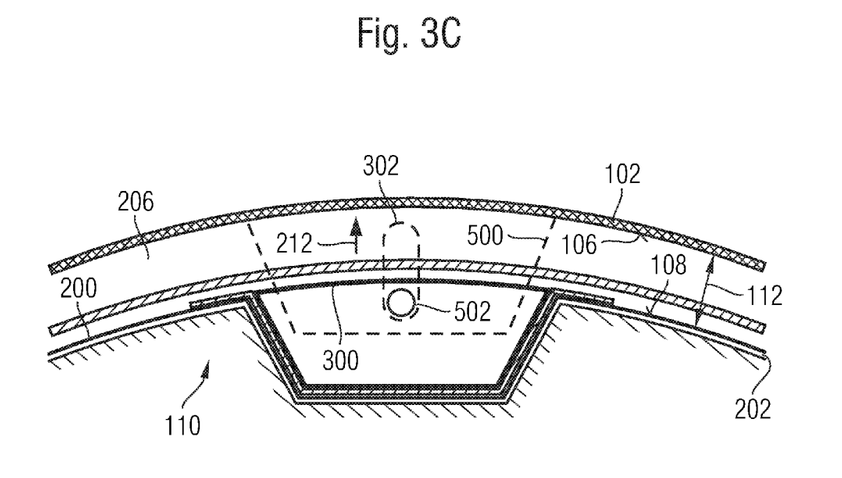

In the state shown in FIG. 3C, the support 110 prepared thus has been arranged in a tubular moulding tool 102. An expansion spacing 112 remains between the support surface 106 and the mould surface, as in the embodiment described above. In order to expand the support 110, its inner region 202 is subjected to excess pressure and/or the intermediate region 206 located between the pressure membrane 200 and the moulding tool 102 is subjected to vacuum. In order to be able to guide the Ω stringer 208 precisely in a radial direction 212 during the expansion procedure, a guide pin 502 is anchored in the placeholder 300 at both ends of the Ω stringer 208. Said guide pin slides in a radially 212 running guide slot 302 which is recessed in a guide cover 500 respectively fitted to the ends of the moulding tool 102.

Figure 3D:
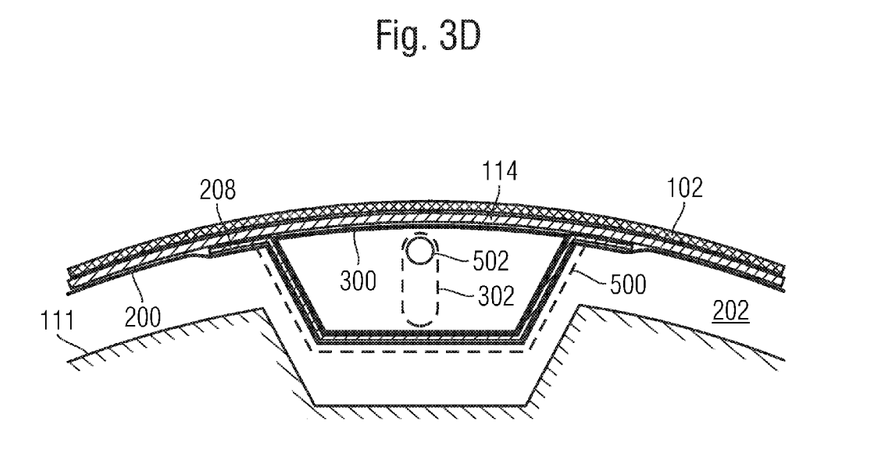

FIG. 3D shows a state in which the pressure membrane presses the tubular non-crimp fibre fabric 114 together with the Ω stringer 208 and the included placeholder 300 against the inner surface 106 of the moulding tool 102 by the applied pressure differential between inner region 202 and intermediate region 206. In subsequent steps, the non-crimp fibre fabric 114 and the Ω stringer 208 are jointly infiltrated by a resin matrix and cured. In so doing, the introduced matrix and the resin material contained in the prepreg of the Ω stringer 208 are combined. After a curing heat treatment, the excess pressure in the inner region 202 and the vacuum in the intermediate region 206 are discharged and the cured fuselage barrel section is removed from the moulding tool 102. After the excess pressure in the interior of the placeholder 300 has also been released, said placeholder is removed below the Ω stringer 208 in order to free its cavity 304.

Although the present invention has been presently described using preferred embodiments, it is not restricted thereto, but can be modified in many different ways.

For example, reinforcing elements of various other profiles can be used. It is possible to produce fuselage barrel sections and other tubular structural components with complex, tapering cross sections, door and window openings.

LIST OF REFERENCE NUMERALS

100 structural component
102 moulding tool
104 outer surface
106 mould surface
108 support surface
110 support
111 frame
112 expansion spacing
114 non-crimp fibre fabric
115 matrix
116 fibres
118 length of the non-crimp fibre fabric before expansion
119 length of the non-crimp fibre fabric after expansion
200 pressure membrane 202 inner region
203 hole
204 vacuum pump
205 compressor
206 intermediate region
208 reinforcing element
209 horizontal portion
210 recess
211 flattened area
212 radial direction
301 membrane sheath
302 guide slot
304 cavity
306 foot portion
500 guide cover
502 guide pin

The invention claimed is:

1. A method for producing a tubular structural component, comprising the steps of:
 providing a tubular moulding tool which has an inner mould surface shaped corresponding to an outer surface of the structural component;
 covering a support surface of an expandable support, which is formed corresponding to the shape of the moulding tool such that in an unexpanded state the support fills the moulding tool while the support surface and the mould surface run parallel to one another leaving an expansion spacing of the support surface to the mould surface, with a tubular non-crimp fibre fabric, such that fibres of a fibre layer of the non-crimp fibre fabric run diagonally around the support;
 arranging the support in the moulding tool;
 pressing the non-crimp fibre fabric against the mould surface by expanding the support with radial expansion of the non-crimp fibre fabric; and
 infiltrating the non-crimp fibre fabric with a curable matrix.

2. The method according to claim 1, wherein after the support has been covered, the tubular non-crimp fibre fabric has a greater length than the structural component.

3. The method according to claim 1, wherein the support comprises a pressure membrane, the support being expanded by the production of a pressure differential between an inner region of the support and an intermediate region between the pressure membrane and the moulding tool.

4. The method according to claim 3, wherein to produce the pressure differential, the pressure in the inner region of the support is increased above atmospheric pressure.

5. The method according to claim 3, wherein to produce the pressure differential, the pressure in the intermediate region is reduced below atmospheric pressure.

6. The method according to claim 1, wherein furthermore a step of arranging a reinforcing element between the support surface and the non-crimp fibre fabric is provided.

7. The method according to claim 6, wherein furthermore a step of guiding the reinforcing element, during the expansion of the support, in a radial direction of the moulding tool is provided.

8. The method according to claim 6, wherein the reinforcing element is arranged between the support surface and the non-crimp fibre fabric as a pre-impregnated or non-impregnated semi-finished fibre product.

9. The method according to claim 6, wherein the reinforcing element is arranged between the support surface and the non-crimp fibre fabric as a pre-cured semi-finished fibre product.

10. The method according to claim 6, wherein the reinforcing element is arranged in a correspondingly configured recess in the support surface.

11. Method according to claim 6, wherein furthermore a placeholder is arranged in a cavity between the reinforcing element and the tubular non-crimp fibre fabric.

12. The method according to claim 11, wherein the placeholder has a membrane sheath and furthermore a step of expanding the placeholder by increasing a pressure in the membrane sheath is provided.

* * * * *